United States Patent [19]

Hepp

[11] Patent Number: 5,412,621
[45] Date of Patent: May 2, 1995

[54] ENCAPSULATED HYDROPHONE ELEMENT FOR TOWED HYDROPHONE ARRAY

[75] Inventor: John S. Hepp, Irving, Tex.

[73] Assignee: Whitehall Corporation, Dallas, Tex.

[21] Appl. No.: 126,078

[22] Filed: Sep. 23, 1993

[51] Int. Cl.⁶ .................................. H04R 17/00
[52] U.S. Cl. .................................. 367/154; 367/155; 367/159; 367/162; 367/20; 310/337; 310/340; 29/594
[58] Field of Search ............... 367/155, 157, 159, 162, 367/165, 176, 154, 20; 310/337, 340; 29/594

[56] References Cited

U.S. PATENT DOCUMENTS

| | | | |
|---|---|---|---|
| 2,614,143 | 10/1952 | Williams | 327/171 |
| 2,708,742 | 5/1955 | Harris | 340/7 |
| 2,782,059 | 2/1957 | Stranberg | 285/247 |
| 2,900,536 | 8/1959 | Palo | 310/9.6 |
| 3,177,016 | 4/1965 | Holmgren | 285/247 |
| 3,258,739 | 6/1966 | Hurley | 340/10 |
| 3,333,236 | 7/1967 | Schloss | 340/8 |
| 3,418,624 | 12/1968 | Massa | 340/9 |
| 3,739,326 | 6/1973 | Kerr et al. | 340/7 |
| 3,764,848 | 10/1973 | Berlincourt | 315/55 |
| 3,996,553 | 12/1976 | Siems et al. | 340/15 |
| 4,012,649 | 3/1977 | Cook et al. | 310/8.3 |
| 4,092,629 | 5/1978 | Siems et al. | 340/15 |
| 4,160,229 | 7/1979 | McGough | 340/7 |
| 4,204,188 | 5/1980 | Weichart et al. | 367/154 |
| 4,437,689 | 3/1984 | Goebel et al. | 285/246 |
| 4,491,939 | 1/1985 | Carpenter | 367/20 |
| 4,636,998 | 1/1987 | Greene et al. | 367/154 |
| 4,733,379 | 3/1988 | Lapetina et al. | 367/20 |
| 4,736,969 | 4/1988 | Fouts | 285/247 |
| 4,782,470 | 11/1988 | Poturnicki et al. | 367/157 |
| 4,787,069 | 11/1988 | Beauducel et al. | 367/21 |
| 4,819,216 | 4/1989 | Fraioli | 367/154 |
| 4,901,287 | 2/1990 | Hathaway et al. | 367/3 |
| 4,951,265 | 8/1990 | Buckles | 367/18 |
| 5,008,581 | 4/1991 | Kumada et al. | 310/323 |

FOREIGN PATENT DOCUMENTS 2137750 10/1984 United Kingdom.
2145226 3/1985 United Kingdom.

OTHER PUBLICATIONS

Proffitt, Jack M. "A History of Innovation in Marine Seismic Data Acquisition", *Geophysics: The Leading Edge of Exploration*, p. 24 (Mar. 1991).

Primary Examiner—J. Woodrow Eldred
Attorney, Agent, or Firm—Konneker Bush Hitt & Chwang

[57] ABSTRACT

Disclosed is an encapsulated hydrophone assembly for use in a towed hydrophone array. The assembly comprises (1) a hydrophone element having a hydrophone electrical conductor, (2) an insulated input electrical lead and an insulated output electrical lead coupled to the hydrophone electrical conductor, (3) an electromagnetic shield surrounding the hydrophone element and the hydrophone electrical conductor, the input electrical lead and the output electrical lead extending from the electromagnetic shield and (4) a layer of encapsulating material surrounding the hydrophone element, the hydrophone electrical conductor, a portion of the input electrical lead, a portion of the output electrical lead and the electromagnetic shield to thereby form the hydrophone assembly. The material electrically insulates the electromagnetic shield from the hydrophone electrical conductor, the input electrical lead and the output electrical lead and prevents fluids surrounding the hydrophone assembly from contacting the electromagnetic shield.

28 Claims, 3 Drawing Sheets

ENCAPSULATED HYDROPHONE ELEMENT FOR TOWED HYDROPHONE ARRAY

TECHNICAL FIELD OF THE INVENTION

The present invention is directed, in general, to hydrophone assemblies for towed arrays and, more specifically, to such assemblies including an encapsulating, waterproof material to prevent fluid surrounding the assembly from contacting and damaging the hydrophone therein.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun". The acoustic wave travels downwardly into the sea bed and is reflected at the interfaces between layers of materials having varying acoustic impedances. The wave travels back upwardly where it is detected by microphone or "hydrophone" elements towed in the water by the vessel to yield information regarding characteristics of the underwater material and structures.

A towed acoustic streamer comprises a plurality of pressure-sensitive hydrophone elements enclosed within a waterproof sheath, given a near-neutral buoyancy and electrically coupled to recording equipment on board the vessel. Streamers that are suspended vertically rather than being towed have no need for the waterproof sheath because they need not be neutrally buoyant. Often, multiple streamers are towed in parallel to form a two-dimensional array of hydrophones. For purposes of this discussion, however, "streamer" and "array" are used somewhat interchangeably.

Each hydrophone element within the towed array is designed to convert the mechanical energy present in pressure variations surrounding the hydrophone element into electrical signals. Most typically, this is done by constructing the hydrophone of a piezoelectric material, such as lead zirconate titanate ("PZT") and a means by which to amplify pressure variations to obtain the strongest possible signal (often by one or more diaphragms acting as tympanic collectors). The hydrophone elements are typically provided with leads or contacts to which to join electrical conductors, the electrical conductors carrying signals from the hydrophone elements to the recording equipment.

A typical towed array is taught in U.S. Pat. No. 4,160,229, which issued on Jul. 3, 1979, directed to a hydrophone streamer apparatus embodying concentric tube construction for achieving improved low noise operation. A plurality of hydrophone elements are supported within a compliant inner tube at spaced intervals therealong by rather complicated compliant mounting means. The inner tube is supported within an elongated outer jacket by compliant support means between the outer surface of the inner tube and the inner surface of the jacket. Suitable support means may comprise a plurality of trilobate devices each formed of three tubular sections equally spaced around the inner tube, the trilobate devices being located along the inner tube at positions between adjacent transducer elements.

During operation, the towed array is surrounded by water. Because a piezoelectric hydrophone element is a high impedance device, any salt water coming into contact with the element causes leakage paths for electrical current present in the leads thereto, either severely distorting the signal produced by the hydrophone element or shorting the hydrophone element entirely. Therefore, it is very important to keep the hydrophone element as free of saltwater contact as possible. Normally, hydrophone elements are immersed in a hydrocarbon fill fluid to give the streamer near neutral buoyancy and to insulate the element from saltwater contact to a certain extent. However, accidental intrusion of saltwater into a streamer is not infrequent. In the past, substantial effort has been directed to solving the problem of waterproofing hydrophone elements when saltwater intrusion of the streamer occurs.

For instance, U.S. Pat. No. 3,258,739, which issued on Jun. 28, 1966, is directed to a piezoelectric hydrophone featuring, among other things, a water resistant skin to keep the hydrophone from contacting the surrounding water.

U.S. Pat. No. 4,782,470, which issued on Nov. 1, 1988, is directed to a pressure-sensitive element having an acoustically transparent water impervious layer interposed and bonded between an exterior surface of the pressure-sensitive element and an interior surface of a rubber housing.

U.S. Pat. No. 3,418,624 is directed to a coaxially mounted line hydrophone having a hollow, substantially cylindrical piezoelectric hydrophone element therein. Electrical leads to and from the element pass through a center of the element. The element is encased in a sound transparent, waterproof jacket of material, such as rubber.

Unfortunately, the structures described above are either difficult or expensive to manufacture or degrade over time due to mechanical flexing of the waterproof coating or chemical interaction of the coating with the surrounding fluid. The above structures also subject the pressure wave to undesirable levels of distortion prior to its contact with the hydrophone element.

At one time, the analog signals output by the hydrophones were typically transmitted to the vessel where they were digitized and stored for later processing and analysis. Since the analog signals were in a frequency range of generally some tens of Hertz, electromagnetic interference with the hydrophone element or the electrical leads extending therefrom were often less of a problem. Today, however, analog signals from hydrophones are typically digitized within the streamer itself and transmitted at high frequencies. Therefore, in the interest of optimizing signal quality in light of these higher frequencies, it has become imperative to provide effective shielding as against stray electromagnetic fields.

It should be recognized first that the output from the hydrophones is in the form of a very faint signal and that this low signal level is obviously very susceptible to noise. Noise in the marine exploration environment can come from many sources and takes many forms. Mechanical noise is generated by the towing ship, by other shipping in the vicinity and by vibration of the streamer both along its length and side-to-side with respect to the direction of travel. The turbulence generated by towing this streamer through the water is also a source of substantial noise. Electrical noise is generated by electronic components and wires proximate the hydrophone inducing electrical currents in either the hydrophone element or its leads. Noise, in the sense of distortion of the signal, is also generated by inaccuracy in the digitization processes.

British published patent application no. 2485226 A, which was published on Mar. 20, 1985, is directed to solution of interference from mechanical noise and teaches a streamer for towing behind a marine vessel engaged in seismic exploration which comprises a plurality of substantially identical modules connected serially to one another, each module comprising plural hydrophones for detecting reflected acoustical waves and producing analog electronic signals in response thereto, a digitizer for converting the analog signals to digital representations thereof and a multiplexed transmitter for sending the digital representations along a conductor within the modules up the streamer to the vessel for recording. Each module comprises a polymer or elastomer wall, open cell foam, a fill fluid of an appropriate specific gravity and Kevlar strength members. Noise caused by digitization can be reduced by the techniques described in British published patent application nos. 2130829 and 2131241.

Isolation from electromagnetic fields is a different proposition. U.S. Pat. No. 4,819,216, which issued on Apr. 4, 1989, is directed to a towed array configuration having an integrated hydrophone, preamplifier and telemetry hybrid unit suitable for connecting with a single coaxial cable. The preamplifier and FM hydrophone telemetry assembly comprises an air-backed ceramic assembly connected to a preamplifier/voltage control oscillator chip. In addition, the chip includes a regulator and power separation network. The configuration is enclosable within an electrostatic shield to provide partial isolation from electromagnetic fields.

U.S. Pat. No. 4,733,375, which issued on Mar. 22, 1988, is directed to a flexible line array transducer assembly for detecting underwater acoustical signals. The assembly includes an array of spaced-apart piezoelectric elements arranged generally in a line and selected to have low cross-coupling characteristics, low sensitivity to incoherent mechanical perturbations in the directions longitudinal and lateral to the axis of the array and high sensitivity to coherent mechanical perturbations, such as acoustical signals. The elements are polarized in a direction generally transverse to the array and each include opposing surface areas which are generally parallel with the linear axis of the array. Electrodes are disposed on the opposing surface areas of the elements and are coupled to conductors which carry signals produced by the piezoelectric elements when the elements are stressed by acoustical signals. A porous, open-cell material is disposed about the piezoelectric elements as a non-waterproof encasement to maintain the elements in place and mechanically isolate the elements. An outer, water-tight jacket encloses the open cell material and holds a fill fluid carried within the open-cell material. An electrically conductive flexible sleeve may be placed either about the open-cell material or about the outer jacket to shield the piezoelectric elements from electromagnetic waves.

Unfortunately, the above-described devices are complicated and expensive to manufacture and may not hold up over years of use. They are also vulnerable to water infusion, causing leakage paths about the hydrophone elements.

As mentioned before, a typical piezoelectric hydrophone element consists of at least one diaphragm. As with all mechanical systems, the hydrophone element has modes of vibration wherein the element generates false signal levels in response to vibration that is sympathetic to external vibration in one or more of these modes. None of the devices described above had attenuation of these sympathetic modes as a specific design objective, although they did attenuate modes to a limited extent by coincidence.

What is needed in the art is a relatively inexpensive scheme for providing (1) water- or fluid-proofing, (2) shielding from stray electromagnetic fields and (3) damping of sympathetic vibrational modes for hydrophone elements.

SUMMARY OF THE INVENTION

Accordingly, to address the above-discussed deficiencies of the prior art, it is an object of the present invention to provide a hydrophone assembly as part of a towed array that is sealed to prevent fluids from around the assembly from leaking to within the assembly and features an integral electromagnetic shielding arrangement. Accordingly, the present invention provides an assembly comprising (1) a hydrophone element having a hydrophone electrical conductor, (2) an insulated input electrical lead and an insulated output electrical lead coupled to the hydrophone electrical conductor, (3) an electromagnetic shield surrounding the hydrophone element and the hydrophone electrical conductor, the input electrical lead and the output electrical lead extending from the electromagnetic shield and (4) a layer of encapsulating material surrounding the hydrophone element, the hydrophone electrical conductor, a portion of the input electrical lead, a portion of the output electrical lead and the electromagnetic shield to thereby form the hydrophone assembly. The material electrically insulates the electromagnetic shield from the hydrophone electrical conductor, the input electrical lead and the output electrical lead and prevents fluids surrounding the hydrophone assembly from contacting the electromagnetic shield. "Conductor," for purposes of the present invention, includes electrical leads, terminals and solder pads on the element itself and other purely conventional arrangements for making electrical contact with a component.

The hydrophone assembly resides, with others, within an elongated cylindrical waterproof sleeve. The sleeve contains a suspending material therein (preferably an open cell foam), the suspending material adapted to resiliently secure all the hydrophone assemblies within the sleeve. Accordingly, each hydrophone assembly comprises a gripping structure (in the disclosed embodiment, a hook-type material such as Velcro) surrounding the encapsulating material, the gripping structure adapted to make contact and engage with a surface surrounding the hydrophone assembly to thereby limit relative motion between the hydrophone assembly and the surface.

In a preferred embodiment of the present invention, the encapsulating material is a polyurethane. Polyurethane has a distinct advantage: it is relatively tough, easy to mold into a desired shape and is chemically compatible with commonly-used hydrocarbon fill fluids. Polyurethane also tends to attenuate sympathetic modes of vibration within the hydrophone element without materially compromising the response of the element to legitimate pressure waves impinging on the assembly. Other polymers or elastomers having these qualities are within the scope of the present invention.

Since the input and output electrical leads must extend from the hydrophone assembly without compromising the waterproof nature of the encapsulation, there must be a good bond between the encapsulating material and insulation surrounding the input and output electrical leads. Accordingly, in a preferred embodiment, the insulation surrounding the leads is also made of the encapsulating material (again, preferably polyurethane).

The electromagnetic shield is preferably a wire mesh formed into a cylinder surrounding the hydrophone element, the input and output electrical leads passing through opposite ends of the cylinder. The hydrophone element is most commonly a piezoelectric element, but the scope of the present invention encompasses all types of hydrophone elements.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
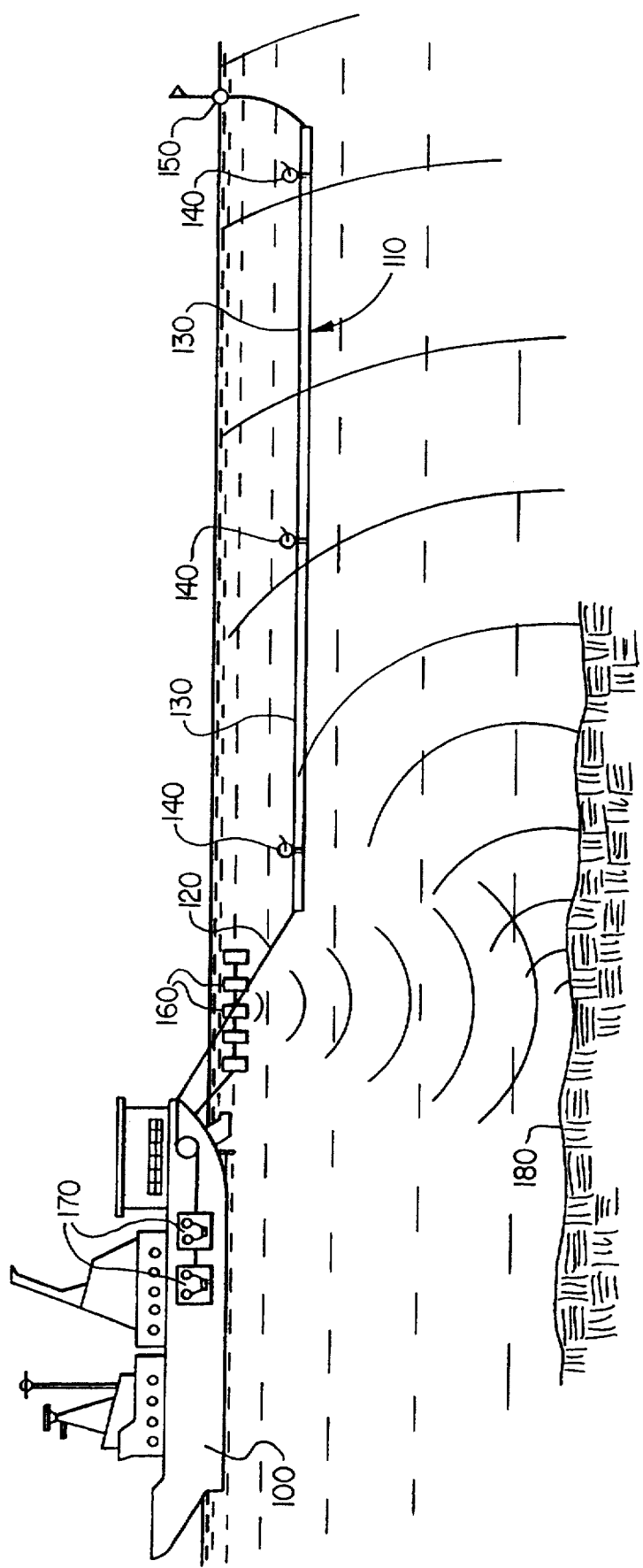
FIG. 1 illustrates an elevational view representing a towed array in operation.

Referring initially to FIG. 1, illustrated is an elevational view representing a towed array in operation. A seismic exploration vehicle 100 tows at least one streamer 110 behind it by way of a tow cable 120. The streamer 110 may comprise a rear buoy 150 if necessary. The streamer 110 is additionally provided with one or more leveling devices or "birds" 140 which serve to regulate the depth of the streamer 110 within the water. The seismic vessel also tows compressed air guns 160 or other sources of acoustic energy which generate an acoustic wave in the water which travels downwardly as shown, reflects at interfaces within the sea bed 180 and is detected by the hydrophones of the streamer 110. As well described in more detail below, the analog signals generated by the hydrophones within the streamer 110 upon receipt of the reflected wave may be converted to digital format by analog-to-digital converters also comprised in the streamer 110 and are transmitted in digital or analog form along the streamer 110 and up the tow cable 120 to be processed and stored by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
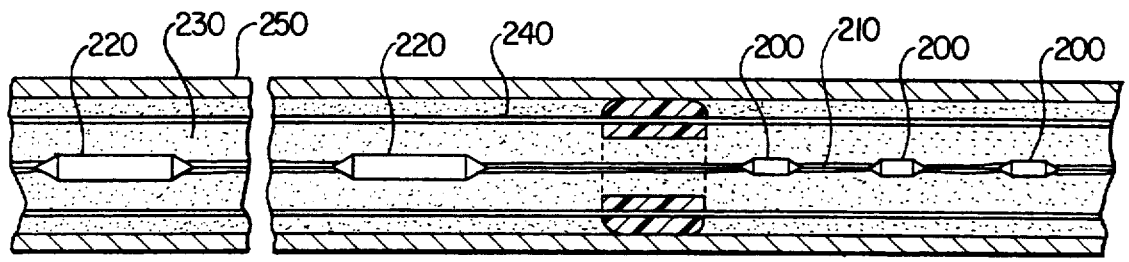
FIG. 2 illustrates a partial cross-sectional view of a typical module 130 of FIG. 1.

Turning now to FIG. 2, illustrated is a partial cross-sectional view of a typical module 130 of FIG. 1. The module 130 comprises a plurality of hydrophone assemblies 200 joined to each other by electrical cables 210. The electrical cables 210 feed into various data processing and transmission units (such as digital data acquisition units and repeater units) 220 spread along a length of the module 130. An open-cell foam 230 and tensioning wires 240 reside within a waterproof jacket 250. The foam 230 laterally suspends the hydrophone assemblies 200 and the units 220 therein and provides a surface suitable for longitudinally fixing the various units 220 in a relatively stable spaced-apart relationship along the length of the module 130. Maintenance of this spaced-apart relationship is important to proper operation of the array because the phase of signals produced by the hydrophone array in response to pressure wave impingement is a function of hydrophone spacing.

The tension cables 240 are used to carry pulling forces generated by the towing vessel and transmitted down the towed array while it is under tow, thereby relieving the cables 210, the jacket 250 and other structures within the jacket 250 from this stress. A fill fluid having a certain desired specific gravity is entrained within the open cell foam 230. This fill fluid is chosen such that, when taken as a whole, the module is filled to a cylindrical shape and has a certain desired specific gravity (preferably a near neutral buoyancy with respect to salt water so as to minimize effort on the part of the birds and turbulence noise caused thereby).

Traditionally, the entrained fill fluid is an aliphated hydrocarbon, although many other fluids have been considered. The specific gravity of the fill fluid is of primary concern. The fill fluid should also not materially attenuate the pressure wave impinging on the streamer. Finally, the fill fluid should be relatively chemically inert, such that the fluid does not harm components within the streamer. In a preferred embodiment of the present invention, the fill fluid is sold under the name NorPar and is an aliphated hydrocarbon. NorPar does not react substantially chemically with polyurethane. Thus, the polyurethane insulation covering the input and output electrical leads and employed as the encapsulation material within the hydrophone assembly itself is not harmed.

Figure 3:
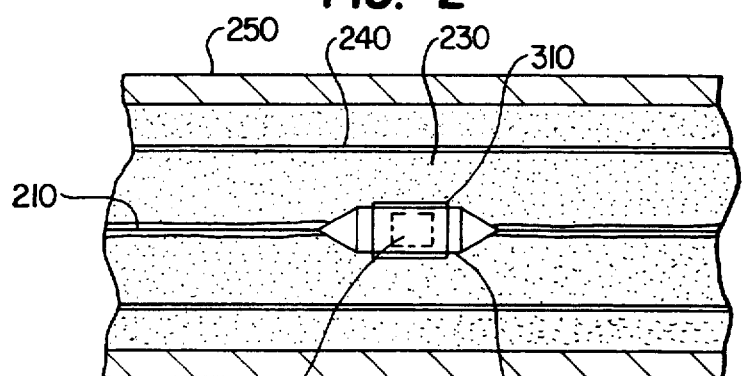
FIG. 3 illustrates an enlarged portion of the partial module illustrated in FIG. 2.

Turning now to FIG. 3, illustrated is an enlarged portion of the partial module illustrated in FIG. 2. Each one of the hydrophone assemblies 200 comprises a hydrophone element 300 entirely encapsulated in a manner to be described more fully in connection with FIG. 4. A gripping structure 310 surrounds the encapsulated hydrophone element, allowing the hydrophone assembly to grip the open cell foam 230 so as to fix it as against longitudinal displacement.

Figure 4:
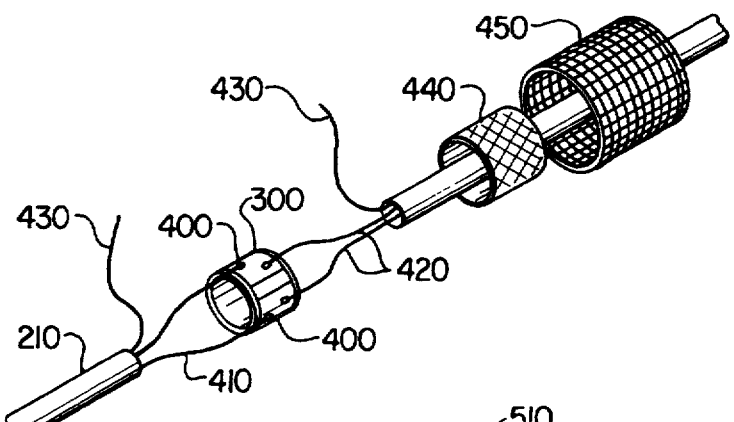
FIG. 4 illustrates an exploded view of the hydrophone assembly 200 of FIG. 2.

Turning now to FIG. 4, illustrated is an exploded view of the hydrophone assembly 200 of FIG. 2. The hydrophone element 300 has a plurality of hydrophone electrical contacts 400 disposed about a periphery thereof. Those skilled in the art should understand that the present invention is not limited to piezoelectric hydrophone elements, nor is it limited to hydrophone elements having a geometry as particularly shown in FIG. 4.

A plurality of input electrical leads 410 and output electrical leads 420 are coupled to the hydrophone electrical contacts 400 to allow signals to be transmitted from the hydrophone element 300 to other hydrophone elements (in series or parallel) or data collection and transmission units and the like, as the particular design dictates. The input electrical leads 410 and output electrical leads 420 are encased within the shielded cable 210. An open mesh sleeve insulator 440 surrounds the hydrophone element 400 and assists the polyurethane in electrically insulating the hydrophone element 400 from the shield 450. A substantially cylindrical electromagnetic shield 450 surrounds the open mesh sleeve insulator 440 and shields the hydrophone element 400 from stray electromagnetic fields produced by surrounding wires and circuits. The shield 450 is preferably a mesh screen and, in a preferred embodiment, is 100 mesh copper screen. Those skilled in the art should recognize that other electromagnetic shield materials are suitable. A metal foil or braided shield 430 surrounds the input and output electrical leads 410, 420 within the cable 210. The shield 430 from each of the input and output electrical leads 410, 420 is preferably electrically joined to the shield 450 (by soldering) to provide a continuous circuit and dissipation for currents developed within the shield 450. Not illustrated in FIG. 4 is a layer of semiconductive tape surrounding the input and output electrical leads 410, 420 and within the shield 430. The semiconductive tape attenuates triboelectric currents that are generated by friction occurring within the input and output electrical leads 410, 420 as they move relative to one another while the module is in use. Unattenuated triboelectric currents distort the low level signals produced within the hydrophone element 400.

Figure 5:
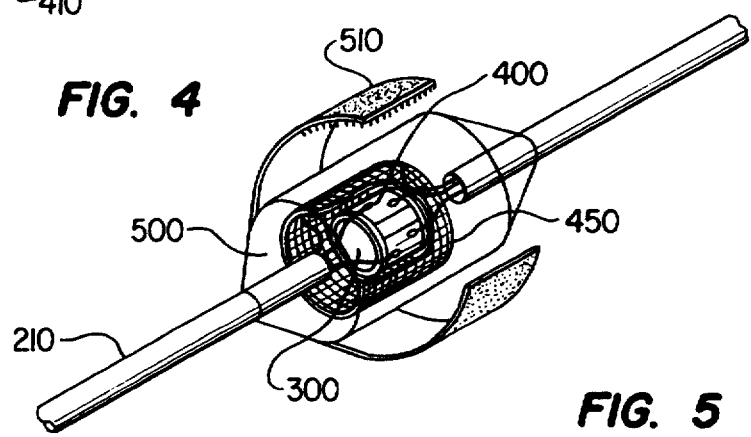
FIG. 5 illustrates the assembly of FIG. 4 after encapsulation.

Turning now to FIG. 5, illustrated is the assembly of FIG. 4, including the hydrophone element 300 and its electrical contacts 400 as surrounded by the shield 450 and a polyurethane capsule 500.

Polyurethane is used for a variety of reasons. First, it does not chemically react with the fill fluid. Second, it has a relatively high admittance for pressure waves, such that they are not attenuated prior to reaching the hydrophone element. Polyurethane has a Shore A hardness factor of less than 85, which appears to be an upper limit of stiffness before attenuation of pressure waves becomes significant. Although attenuation of pressure waves as a function of Shore A hardness is frequency-dependent, the frequencies of interest (on the order of less than a few kilohertz) are below a threshold. Fourth, polyurethane is inexpensive and relatively easy to form into a desired shape allowing the hydrophone assembly to have a desired shape.

The polyurethane capsule 500 is adapted to fix the hydrophone element 300, the leads 410, 420 to and from the element 300 and the shield 450 against relative motion therebetween. A gripping structure 510 is placed over the capsule 500. The gripping structure is preferably comprised of a plurality of flexible hooks embedded in a fabric (commonly known as Velcro). This gripping structure grips the surface of the open cell foam to discourage longitudinal movement of the hydrophone element therein.

It is highly desirable to have a good bond between a jacket of the cable 210 and the polyurethane capsule 500. Accordingly, in a preferred embodiment of the present invention, the jacket of the cable 210 is similarly polyurethane, although other jackets are within the scope of the present invention. It is merely important to maintain a good seal as against fluid invasion.

One feasible alternative to providing a Velcro-type material to the outside of the polyurethane capsule is to mold nubs or other gripping protrusions into the polyurethane capsule itself. These protrusions perform the same function as the Velcro hooks and are within the scope of the present invention.

Figure 6:
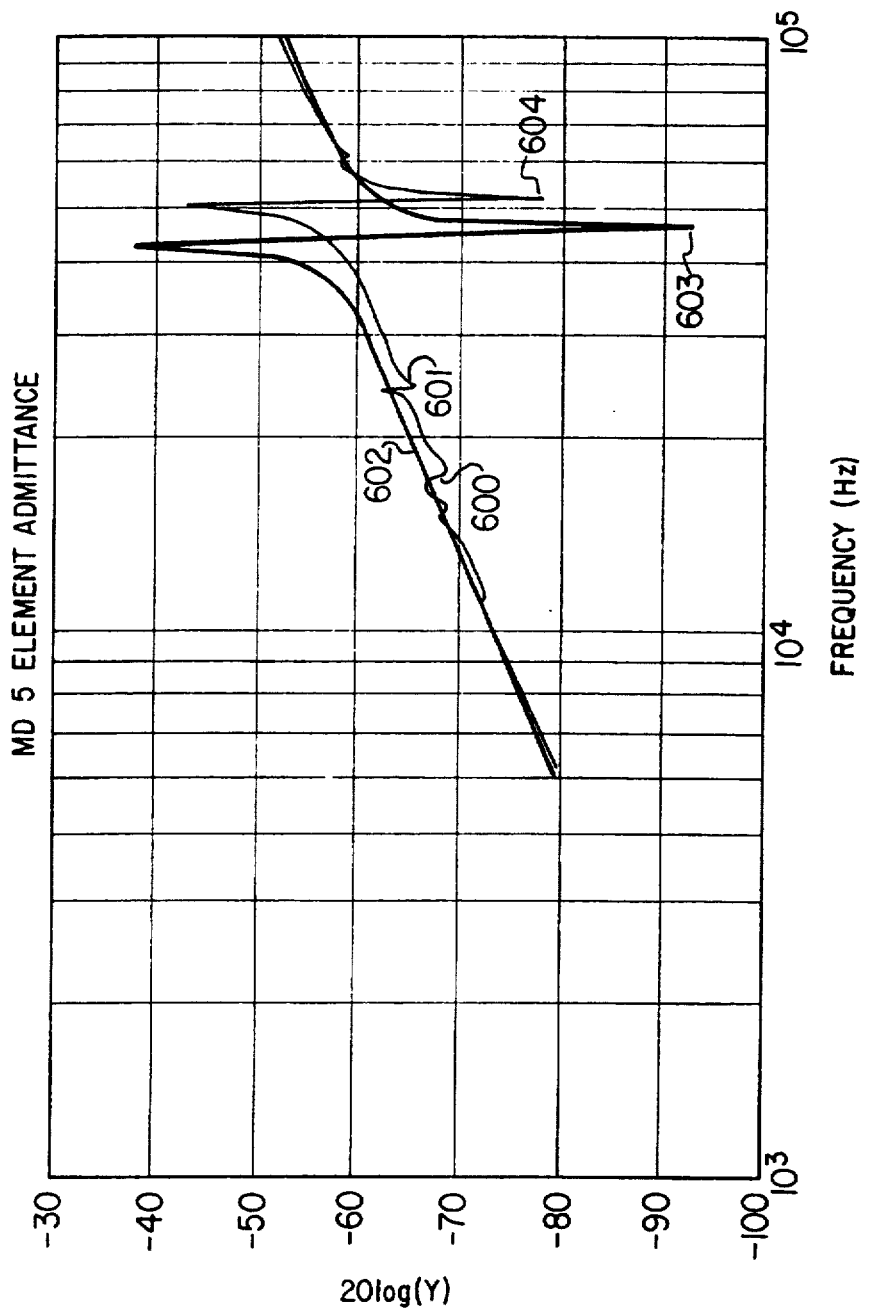
FIG. 6 illustrates an admittance diagram of frequency response to pressure stimulation of a hydrophone element before and after encapsulation in polyurethane per the present invention.

Tuning now to FIG. 6, illustrated is an admittance diagram of frequency response to pressure stimulation of a hydrophone element before and after encapsulation in polyurethane per the present invention. Of particular interest is that modes of sympathetic vibration 600, 601 that are present before the hydrophone element is encapsulated or "potted" within the polyurethane are absent after "potting" (note area 602). It is also important to note that there is a degree of frequency shifting (from point 604 to point 603) due to the potting, but this is of relative inconsequence because of the low frequency of the signals of interest in geophysical applications.

From the above, it is apparent that the present invention provides an encapsulated hydrophone assembly for use in a towed hydrophone array comprising (1) a hydrophone element having a hydrophone electrical conductor, (2) an insulated input electrical lead and an insulated output electrical lead coupled to the hydrophone electrical conductor, (3) an electromagnetic shield surrounding the hydrophone element and the hydrophone electrical conductor, the input electrical lead and the output electrical lead extending from the electromagnetic shield and (4) a layer of encapsulating material surrounding the hydrophone element, the hydrophone electrical conductor, a portion of the input electrical lead, a portion of the output electrical lead and the electromagnetic shield to thereby form the hydrophone assembly. The material electrically insulates the electromagnetic shield from the hydrophone electrical conductor, the input electrical lead and the output electrical lead and prevents fluids surrounding the hydrophone assembly from contacting the electromagnetic shield.

Although the present invention and its advantages have been described in detail, it should be understood that various changes, substitutions and alterations can be made herein without departing from the spirit and scope of the invention as defined by the appended claims.

What is claimed is:

1. A hydrophone assembly, comprising:
    a hydrophone element having a hydrophone electrical conductor;
    an insulated input electrical lead and an insulated output electrical lead coupled to said hydrophone electrical conductor;
    an electromagnetic shield surrounding said hydrophone element and said hydrophone electrical conductor, said input electrical lead and said output electrical lead extending from said electromagnetic shield;
    a layer of encapsulating material surrounding said hydrophone element, said hydrophone electrical conductor, a portion of said input electrical lead, a portion of said output electrical lead and said electromagnetic shield to thereby form said hydrophone assembly, said material electrically insulating said electromagnetic shield from said hydrophone electrical conductor, said input electrical lead and said output electrical lead, said material further preventing fluids surrounding said hydrophone assembly from contacting said electromagnetic shield; and a cylindrical sleeve for housing said hydrophone assembly and a suspending material therein, said suspending material adapted to resiliently secure said hydrophone assembly within said sleeve.

2. The assembly as recited in claim 1 further comprising a gripping structure surrounding said encapsulating material, said gripping structure adapted to make contact and engage with a surface surrounding said hydrophone assembly to thereby limit relative motion between said hydrophone assembly and said surface.

3. The assembly as recited in claim 1 wherein said electromagnetic shield is substantially cylindrical, said input electrical lead and said output electrical lead extending from opposite ends of said electromagnetic shield.

4. The assembly as recited in claim 1 wherein said hydrophone element has a plurality of hydrophone electrical conductors extending therefrom, said hydrophone electrical conductors electrically insulated from one another.

5. The assembly as recited in claim 1 wherein electrical insulation surrounding said input electrical lead and said output electrical lead is made of said encapsulating material.

6. The assembly as recited in claim 1 wherein said encapsulating material is polyurethane.

7. The assembly as recited in claim 1 wherein said electromagnetic shield is a wire mesh.

8. The assembly as recited in claim 1 wherein said hydrophone element includes piezoelectric material.

9. The assembly as recited in claim 1 further comprising a gripping layer of fabric having a plurality of hooks joined thereto surrounding said encapsulating material, said gripping layer adapted to make contact and engage with a surface surrounding said hydrophone assembly to thereby limit relative motion between said hydrophone assembly and said surface.

10. The assembly as recited in claim 1 wherein said layer of encapsulating material encapsulates said hydrophone assembly, preventing relative motion between said hydrophone element, said hydrophone electrical conductor, said electromagnetic shield and said portions of said input electrical lead and said output electrical lead surrounded by said encapsulating material.

11. A method of manufacturing a hydrophone assembly, comprising the steps of:

providing a hydrophone element having a hydrophone electrical conductor;

coupling an insulated input electrical lead and an insulated output electrical lead to said hydrophone electrical conductor;

surrounding said hydrophone element and said hydrophone electrical conductor with an electromagnetic shield, said input electrical lead and said output electrical lead extending from said electromagnetic shield;

surrounding said hydrophone element, said hydrophone electrical conductor, a portion of said input electrical lead, a portion of said output electrical lead and said electromagnetic shield with a layer of encapsulating material to thereby form said hydrophone assembly, said material electrically insulating said electromagnetic shield from said hydrophone electrical conductor, said input electrical lead and said output electrical lead, said material further preventing fluids surrounding said hydrophone assembly from contacting said electromagnetic shield; and placing said hydrophone assembly in a cylindrical sleeve having a suspending material, therein, said suspending material adapted to resiliently secure said hydrophone assembly within said sleeve.

12. The method as recited in claim 11 further comprising the step of surrounding said encapsulating material with a gripping structure, said gripping structure adapted to make contact and engage with a surface surrounding said hydrophone assembly to thereby limit relative motion between said hydrophone assembly and said surface.

13. The method as recited in claim 11 wherein said electromagnetic shield is substantially cylindrical, said input electrical lead and said output electrical lead extending from opposite ends of said electromagnetic shield.

14. The method as recited in claim 11 wherein said hydrophone element has a plurality of hydrophone electrical conductors extending therefrom, said hydrophone electrical conductors electrically insulated from one another.

15. The method as recited in claim 11 wherein electrical insulation surrounding said input electrical lead and said output electrical lead is made of said encapsulating material.

16. The method as recited in claim 11 wherein said encapsulating material is polyurethane.

17. The method as recited in claim 11 wherein said electromagnetic shield is a wire mesh.

18. The method as recited in claim 11 wherein said hydrophone element includes piezoelectric material.

19. The method as recited in claim 11 further comprising the step surrounding said encapsulating material with a gripping layer of fabric having a plurality of hooks joined thereto, said gripping layer adapted to make contact and engage with a surface surrounding said hydrophone assembly to thereby limit relative motion between said hydrophone assembly and said surface.

20. The method as recited in claim 11 wherein said layer of encapsulating material encapsulates said hydrophone assembly, preventing relative motion between said hydrophone element, said hydrophone electrical conductor, said electromagnetic shield and said portions of said input electrical lead and said output electrical lead surrounded by said encapsulating material.

21. A towed array, comprising:

a hydrophone module, said module comprising a cylindrical sleeve having a plurality of hydrophone assemblies and a suspending material therein, said suspending material adapted to resiliently secure said hydrophone assemblies within said sleeve, said sleeve further containing a fluid therein, said fluid giving said hydrophone module a preselected specific gravity, said hydrophone assemblies each comprising:

a hydrophone element having a hydrophone electrical conductor;

an insulated input electrical lead and an insulated output electrical lead coupled to said hydrophone electrical conductor;

an electromagnetic shield surrounding said hydrophone element and said hydrophone electrical conductor, said input electrical lead and said output electrical lead extending from said electromagnetic shield;

a layer of encapsulating material surrounding said hydrophone element, said hydrophone electrical conductor, a portion of said input electrical lead, a portion of said output electrical lead and said electromagnetic shield to thereby form one of said hydrophone assemblies, said material electrically insulating said electromagnetic shield from said hydrophone electrical conductor, said input electrical lead and said output electrical lead, said material further preventing said fluid from contacting said hydrophone assembly; and a gripping layer of fabric having a plurality of hooks joined thereto surrounding said encapsulating material, said gripping layer adapted to make contact and engage with said suspending material, said input electrical lead and said output electrical lead electrically coupled to other input electrical leads and output electrical leads to couple said hydrophone assemblies.

22. The array as recited in claim 21 wherein said electromagnetic shield is substantially cylindrical, said input electrical lead and said output electrical lead extending from opposite ends of said electromagnetic shield.

23. The array as recited in claim 21 wherein said hydrophone element has a plurality of hydrophone electrical conductors extending therefrom, said hydrophone electrical conductors electrically insulated from one another.

24. The array as recited in claim 21 wherein electrical insulation surrounding said input electrical lead and said output electrical lead is made of said encapsulating material.

25. The array as recited in claim 21 wherein said encapsulating material is polyurethane.

26. The array as recited in claim 21 wherein said electromagnetic shield is a wire mesh.

27. The array as recited in claim 21 wherein said hydrophone element includes piezoelectric material.

28. The array as recited in claim 21 wherein said layer of encapsulating material encapsulates said hydrophone assembly, preventing relative motion between said hydrophone element, said hydrophone electrical conductor, said electromagnetic shield and said portions of said input electrical lead and said output electrical lead surrounded by said encapsulating material.

* * * * *